United States Patent [19]

Doshi

[11] Patent Number: 4,666,664
[45] Date of Patent: May 19, 1987

[54] COOLANT FLOW PATHS WITHIN A NUCLEAR FUEL ASSEMBLY

[75] Inventor: Pratap K. Doshi, Murrysville, Pa.

[73] Assignee: Westinghouse Electric Corp., Pittsburgh, Pa.

[21] Appl. No.: 794,582

[22] Filed: Nov. 1, 1985

Related U.S. Application Data

[63] Continuation of Ser. No. 602,089, Apr. 19, 1984, abandoned, which is a continuation of Ser. No. 368,552, Apr. 15, 1982, abandoned.

[51] Int. Cl.⁴ .................. G21C 15/02; G21C 3/32
[52] U.S. Cl. ........................ 376/261; 376/443; 376/444; 376/448
[58] Field of Search .............. 376/444, 443, 434, 439, 376/448, 446, 449, 442, 373, 377, 352, 370, 371, 261, 260

[56] References Cited

U.S. PATENT DOCUMENTS

| | | | |
|---|---|---|---|
| 2,982,713 | 5/1961 | Sankovich et al. | 376/448 X |
| 3,158,543 | 11/1964 | Sherman et al. | 376/449 X |
| 3,164,530 | 1/1965 | Banks | 376/446 X |
| 3,265,144 | 9/1965 | Jabsen | 376/364 |
| 3,350,275 | 10/1967 | Venier et al. | 376/442 |
| 3,377,254 | 4/1968 | Frisch | 376/446 X |
| 3,379,617 | 4/1980 | Andrews et al. | 376/442 |
| 3,466,226 | 9/1969 | Lass | 376/425 |
| 3,574,058 | 4/1971 | Gumuchian | 376/444 X |
| 3,607,639 | 9/1971 | Santen et al. | 376/446 X |
| 3,802,995 | 4/1974 | Fritz et al. | 376/435 |
| 4,067,772 | 1/1978 | Kim | 376/370 X |
| 4,088,534 | 5/1978 | Andrieu et al. | 376/327 X |
| 4,119,489 | 10/1978 | Itoh et al. | 376/446 X |
| 4,142,934 | 3/1979 | Wild | 376/448 X |
| 4,348,355 | 9/1982 | Nylund | 376/434 |
| 4,416,852 | 11/1983 | Nylund | 376/438 |
| 4,478,786 | 10/1984 | Andersson et al. | 376/444 |

FOREIGN PATENT DOCUMENTS

| | | | |
|---|---|---|---|
| 1150423 | 7/1983 | Canada | 376/444 |
| 0036142 | 9/1981 | European Pat. Off. | 376/444 |
| 0065238 | 11/1982 | European Pat. Off. | 376/438 |
| 0125395 | 9/1979 | Japan | 376/254 |
| 7214019 | 8/1976 | Sweden . | |
| 8002080 | 2/1982 | Sweden . | |
| 0947104 | 1/1964 | United Kingdom | 376/254 |
| 0992021 | 5/1965 | United Kingdom | 376/448 |

Primary Examiner—Deborah L. Kyle
Assistant Examiner—Dan Wasil

[57] ABSTRACT

In a nuclear fuel assembly having a plurality of separate fuel bundles secured therein in separate compartments, coolant flow paths are provided to enable the flow of coolant between the separate compartments, thereby equalizing the hydraulic pressure between the separate compartments and minimizing the possibility of thermal-hydrodynamic instability between the separate fuel bundles in the nuclear fuel assembly. A plurality of coolant flow paths are formed through solid structural ribs secured to an outer flow channel of the nuclear fuel assembly to permit coolant flow between the separate compartments.

13 Claims, 11 Drawing Figures

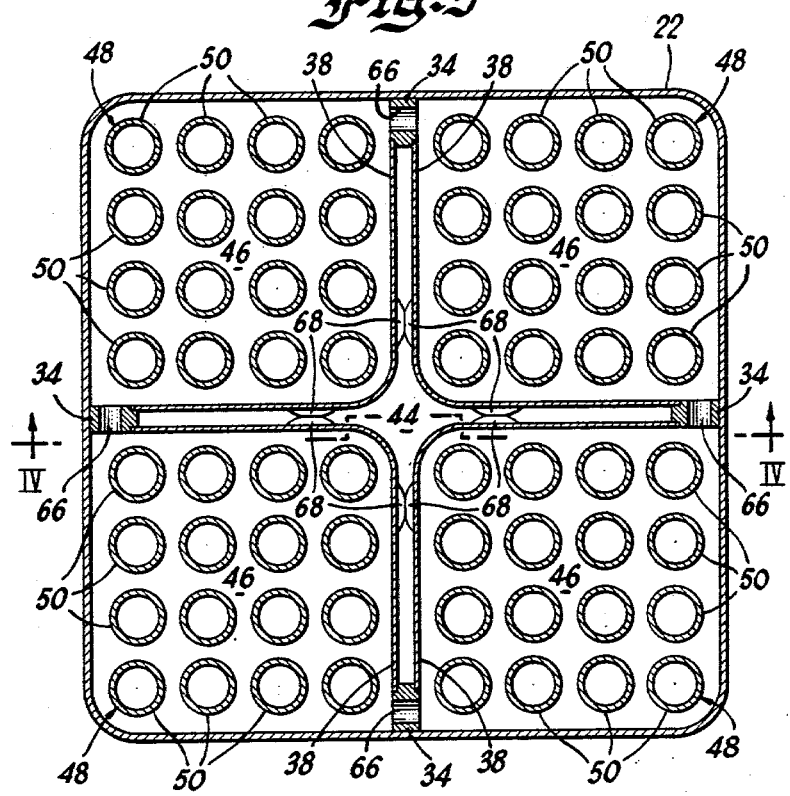
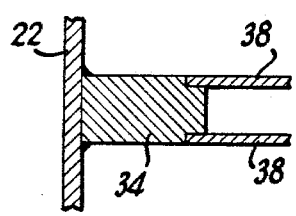
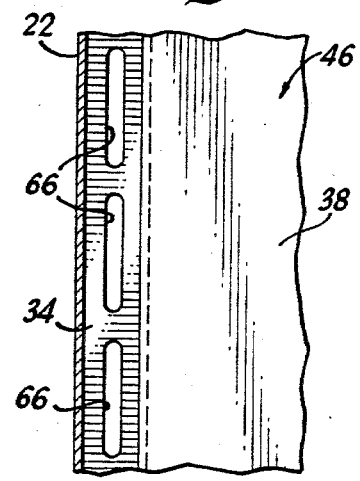
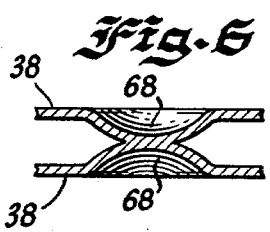

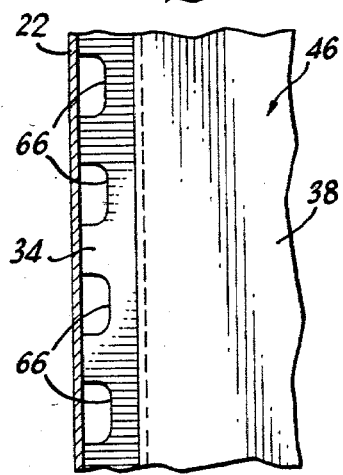
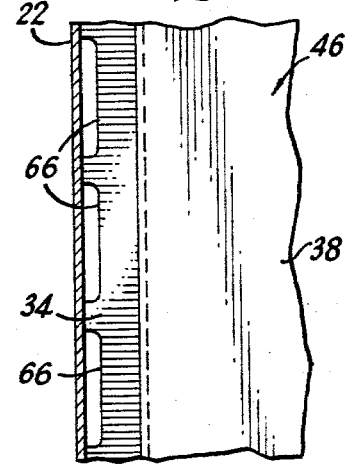
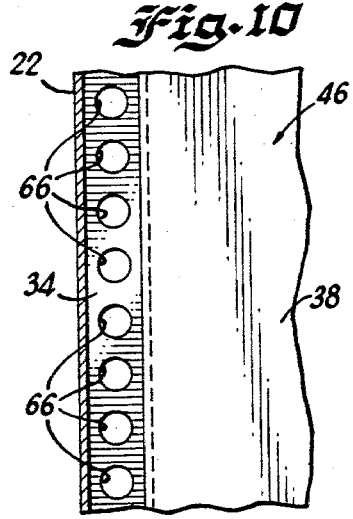
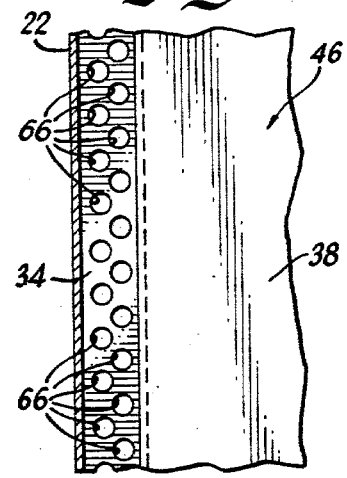

COOLANT FLOW PATHS WITHIN A NUCLEAR FUEL ASSEMBLY

CROSS-REFERENCE TO RELATED APPLICATION

This application is a continuation of application Ser. No. 602,089, filed Apr. 19, 1984, now abandoned, which is a continuation of application Ser. No. 368,552, filed Apr. 15, 1982, now abandoned.

The present application is related to U.S. Pat. No. 4,560,532 granted Dec. 24, 1985 to Robert F. Barry et al. for Nuclear Fuel Assembly and assigned to the same assignee as the present application.

BACKGROUND OF THE INVENTION

1. Field of the Invention

The device of the present invention generally relates to nuclear fuel assemblies and, more particularly, to new and improved apparatus and methods for providing coolant flow paths between separate fuel sections of a single nuclear fuel assembly.

2. Description of the Prior Art

The generation of a large amount of heat energy through nuclear fission in a nuclear reactor is old and now well known. This energy is dissipated as heat in elongated nuclear fuel rods. A plurality of the nuclear fuel rods are grouped together to form separately removable nuclear fuel assemblies. A number of such nuclear fuel assemblies are typically arranged in a matrix to form a nuclear reactor core capable of a self-sustained, nuclear fission reaction. The core is typically submersed in a fluid, such as light water, that serves as a coolant for removing heat from the nuclear fuel rods and as a neutron moderator.

A typical nuclear fuel assembly may be formed by a 7×7 or an 8×8 array of spaced-apart, elongated rods supported between upper and lower tie plates. Examples of such typical nuclear fuel assemblies are depicted in and described in U.S. Pat. Nos. 3,350,275; 3,466,226 and 3,802,995. In a typical boiling water reactor nuclear fuel assembly having an 8×8 rod array, the sixty-four rods that form the 8×8 array may be either sixty-four fuel rods or one or more non-fueled, water moderator rods with the remaining rods being fuel rods. A common problem in typical boiling water reactor nuclear fuel assemblies of the types depicted in the above-identified patents is that the central region of such fuel assemblies may be undermoderated and overenriched. In order to increase the flow of moderator in the central region of such boiling water reactor nuclear fuel assemblies, one or more elongated, water moderator rods have been substituted for fuel rods in the central region of the nuclear fuel assemblies. For example, water moderator rods 41 and 42 are dipicted in and described in the above-identified U.S. Pat. No. 3,802,995.

The flow of moderator may be increased, as disclosed in the above-identified Barry et al. application, an internal, centrally located or central water cross formed by four, elongated metal angles dividing the nuclear fuel assembly into four sections or quadrants along the length of the nuclear fuel assembly. A separate fuel bundle or subassembly is located in each of the four sections. The central water cross provides a region for subcooled moderator flow through the center of the nuclear fuel assembly along the lengths of the nuclear fuel rods for improving neutron moderation and economy. In addition, the central water cross enables a full complement of fuel rods to be used within the nuclear fuel assemby by eliminating the need for one or more water moderator rods as discussed above.

In the nuclear fuel assembly of this latter type flow paths are provided between the separate sections of the nuclear fuel assembly to provide hydraulic pressure equalization therebetween. The four angles forming the central water cross have numerous sealed passages formed therethrough to permit coolant flow between the separate sections of the nuclear fuel assembly. In accordance with the teachings of the prior art each sealed passage may be formed by perforating the walls of the four angles forming the central water cross and reforming the perforated material into a channel or passage which is then sealed from the interior of the central water cross, that is, the region of subcooled moderator flow, by one or more circumferential welds. While such coolant flow paths between the separate sections of the nuclear fuel assembly are effective in performing their intended function, manufacturing difficulties arise in forming many such flow paths within a single fuel assembly and in ensuring that no weld failures occur that could result in the mixture of boiling coolant from the separate sections of the nuclear fuel assembly with the subcooled moderator flowing in the central water cross.

SUMMARY OF THE INVENTION

An object of the present invention is to provide a new and improved nuclear fuel assembly.

Another object of the present invention is to provide a new and improved nuclear fuel assembly having new and improved coolant flow paths between separate fuel sections of a nuclear fuel assembly.

Briefly, the device of the present invention provides new and improved coolant flow paths between separate fuel sections along the length of a nuclear fuel assembly. Specifically, the nuclear fuel assembly includes an internal, central water cross that divides the nuclear fuel assembly into four sections or quadrants along the length of the nuclear fuel assembly and that is formed by four, elongated, metal angles that are spaced apart and welded to four, elongated, metal, spaced-apart, solid, structural ribs. The ribs are secured to the inner walls of an outer flow channel of the nuclear fuel assembly. A bundle or subassembly of nuclear fuel rods is disposed in each one of the four separate sections of the nuclear fuel assembly. In order to provide coolant flow paths between the four separate bundles, a plurality of flow paths are formed in and through the four structural ribs as elongated slots or as circular holes or as cutouts therein. The elongated metal angles forming the central water cross are maintained in a spaced-apart relationship by non-perforated dimples formed in the angles. In this manner, effective coolant flow paths and communication are provided between the four, separate fuel bundles of the nuclear fuel assembly without the need for forming sealed passages through the elongated metal angles forming the central water cross.

BRIEF DESCRIPTION OF THE DRAWING

The above and other objects and advantages and novel features of the present invention will become apparent from the following detailed description of the embodiments of the invention illustrated in the accompanying drawing wherein:

FIG. 3 is an enlarged, cross-sectional view of the device of FIG. 1 taken along line III—III of FIG. 1;

FIG. 5 is an enlarged fragmentary, cross-sectional view of a portion of the device of FIG. 1 taken along line V—V of FIG. 4;

FIG. 6 is an enlarged, fragmentary, cross-sectional view of a portion of the device of FIG. 1 taken along line VI—VI of FIG. 4; and FIGS. 7-11 are enlarged, fragmentary, cross-sectional views of alternative embodiments of coolant flow paths in a nuclear fuel assembly constructed in accordance with the principles of the present invention.

DESCRIPTION OF THE PREFERRED EMBODIMENT

Figure 1:
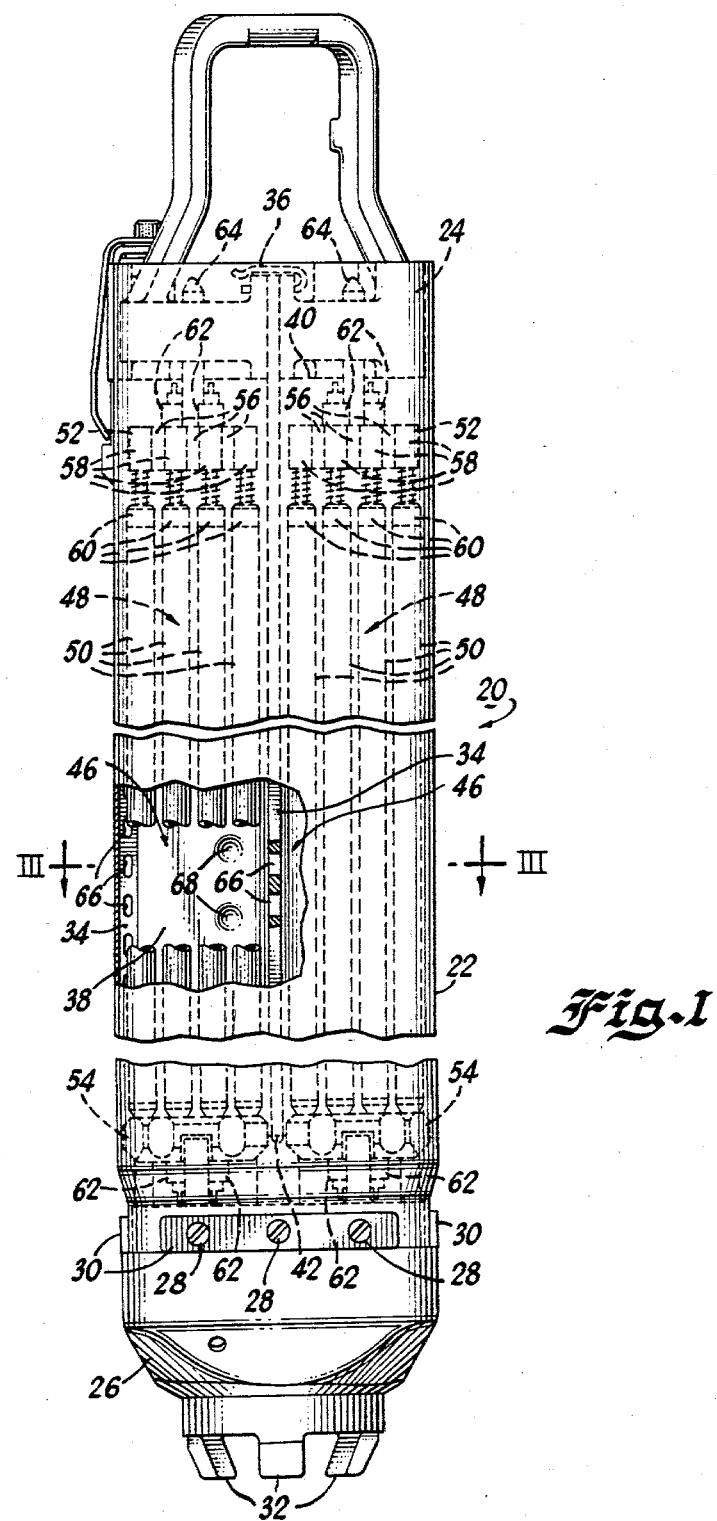
FIG. 1 is a broken-away, front-elevational view of a nuclear fuel assembly constructed in accordance with the principles of the present invention.
Figure 2:
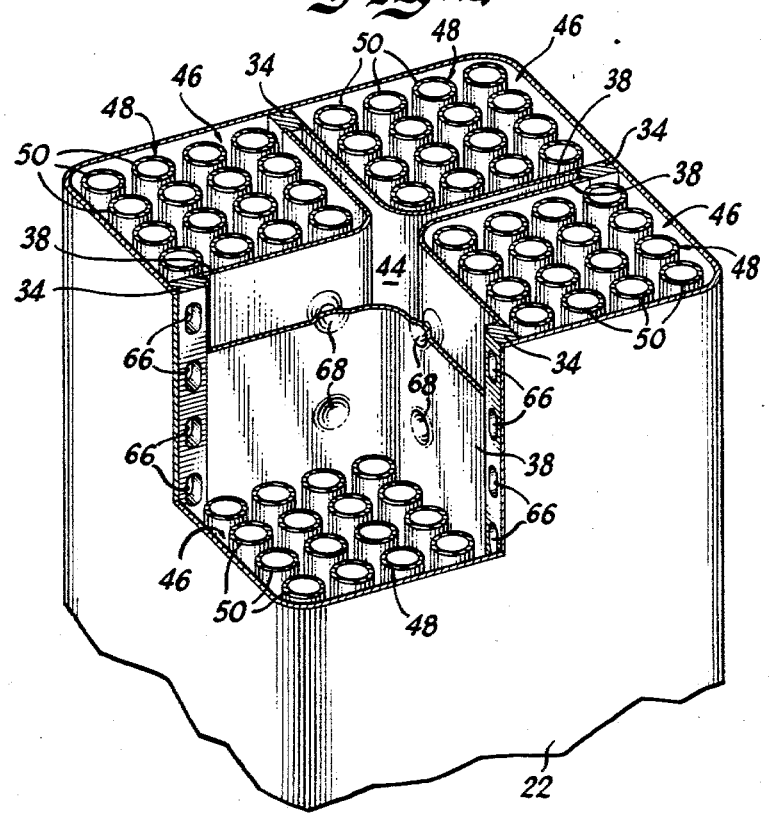
FIG. 2 is an enlarged, fragmentary, broken-away, perspective view of a portion of the device of FIG. 1.
Figure 4:
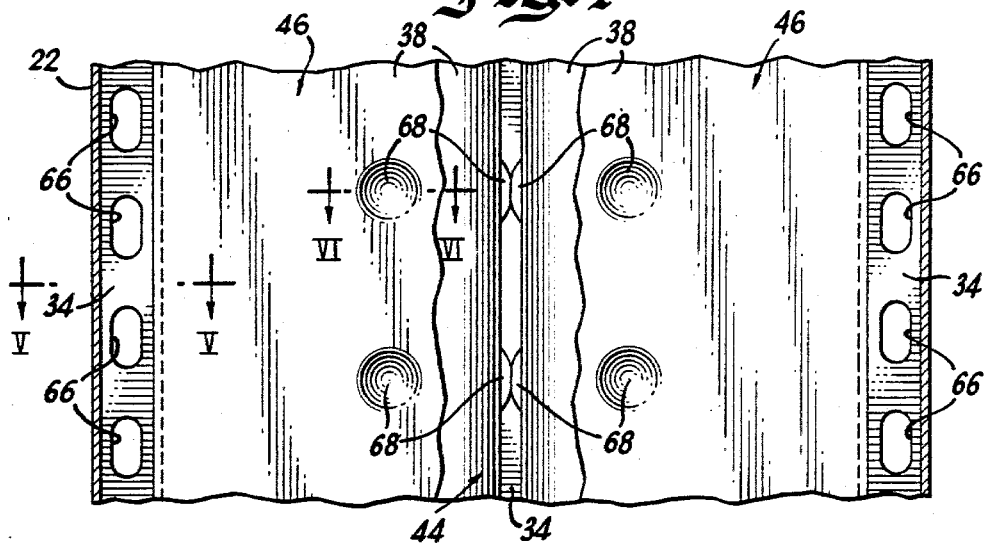
FIG. 4 is an enlarged, fragmentary, cross-sectional view of a portion of the device of FIG. 1 taken along line IV—IV of FIG. 3.

Referring to the drawing and initially to FIGS. 1-6, there is illustrated a new and improved nuclear fuel assembly 20 constructed in accordance with the principles of the present invention. The fuel assembly 20 includes an elongated outer flow channel 22 that extends along substantially the entire length of the fuel assembly 20 and interconnects an upper yoke 24 with a lower base 26. The channel 22 is preferably attached to the base 26 through a tongue groove connection; and screws 28 interconnected by a retaining bar 30 are used to retain the tongue formed by the lower section of the flow channel 22 in the groove in the base 26. The lower end of the flow channel is reduced in its outer lateral dimensions to permit an interconnection between the flow channel and the base 26 without it being necessary that the base 26 have outer dimensions that exceed the outer dimensions of the flow channel 22 along the length of the fuel assembly 20. The base 26 that serves as an inlet for coolant flow includes a plurality of legs 32 for guiding the base 26 and the fuel assembly 20 into a reactor core support plate or into fuel storage racks, for example, in a spent fuel pool.

In accordance with an important feature of the present invention, secured to and centrally located along the four inner walls of the flow channel 22 substantially along its entire length is a plurality of four, spaced-apart, apertured, structural ribs 34. The ribs 34 and the flow channel 22 are preferably formed from a metal material, such as an alloy of zirconium, commonly referred to as Zircaloy, and may be securely interconnected by any convenient means, such as by welding. The structural ribs 34 are used to interconnect the flow channel 22 to the yoke 24 by a locking pin 36 that passes through aligned apertures in both the yoke 24 and the upper end of each of the four structural ribs 34. The structural ribs 34 also act as the supports for a plurality of four, elongated, generally L-shaped, metal channels or angles 38 that extend generally along the entire length of the fuel assembly 20 from an upper end 40 to a lower end 42. Preferably, the outer, elongated lateral ends of the angles 38 are welded to and along the lengths of the structural ribs 34 in order to securely retain the angles 38 in position within the fuel assembly. When secured to the structural ribs 34, the angles 38 form an internal, centrally located or central water cross 44 that divides the fuel assembly 20 into four, separate, elongated compartments 46 and that provides a region for subcooled moderator flow through the center of the nuclear fuel assembly for improving neutron moderation and economy.

Disposed within each of the compartments 46 is a separate fuel bundle or subassembly 48 having a plurality of sixteen fuel rods 50 arranged in a 4×4 array. The fuel rods 50 of each bundle 48 are disposed between an upper tie plate 52 and a lower tie plate 54. Preferably, the upper tie plate 52 is formed as a connected series of thin web members or bars 56 that are secured to small cylinders 58 for receiving with a slip fit an elongated portion of the upper end plug 60 of each fuel rod 50 to permit relative axial or vertical movement between the upper tie plate 52 and the fuel rods 50. Preferably, at least two fuel rods 50 of each bundle 48 have upper and lower end plugs that have elongated threaded ends that pass through the upper tie plate 52 and lower tie plate 54 for receipt of locking or retaining nuts 62 at each end thereof, thereby interconnecting the tie plates 52 and 54 at the longitudinal ends of the bundle 48.

In addition, each of the upper tie plates 52 includes a vertical post or locating pin 64 fixedly secured thereto that passes with a slip fit through apertures formed in the upper yoke 24 to permit relative axial or vertical movement between the bundles 48 and the flow channel 22 and also to restrain lateral or radial movements of the bundles 48. A more detailed description of the various components of the fuel assembly 20 may be obtained by reference to the description and drawing of the above-identified copending patent application.

In accordance with an important feature of the present invention, a plurality of apertures 66 are formed through each of the structural ribs 34 along the lengths thereof that provide internal coolant flow paths between the four separate bundles 48 to equalize the hydraulic pressure between the four separate compartments 46 and fuel bundles 48 of the fuel assembly 20 thereby minimizing the possibility of thermal-hydrodynamic instability between the separate fuel bundles 48. The coolant flow paths through the apertures 66 bypass the central water cross 44, thereby reducing the possibility of mixing boiling coolant from one or more of the four compartments 46 with the subcooled moderator flowing through the central water cross 44.

In accordance with a further important feature of the present invention, a plurality of dimples 68 are formed in and along the lengths of the angles 38. Preferably, the dimples 68 in each of the angles 38 are laterally and vertically aligned with corresponding dimples 68 in adjacent angles 38 (FIGS. 2-4 and 6) in order to provide pairs of opposed dimples 68 that contact each other along the lengths of the angles 38 to maintain the facing portions of the angles 38 in a proper spaced-apart relationship. If desired, the pairs of contacting dimples 68 may be spot welded to ensure that the spacing between the angles 38 forming the central water cross 44 is accurately maintained.

In accordance with a further important feature of the present invention, the apertures 66 forming the coolant flow paths between four separate compartments 46 may be formed with any desired configuration, such as generally oval apertures (FIGS. 1-4); elongated slots (FIG. 7); generally oval cutouts in the structural ribs 34 (FIG. 8); elongated slotted cutouts in the structural ribs 34 (FIG. 9); vertically aligned, spaced-apart round holes of a relatively large diameter (FIG. 10); or staggered or offset, round holes of a relatively small diameter (FIG. 11). The precise shape and number of the apertures 66 through the ribs 34 should be selected in accordance with the specific thermal, hydraulic, mechanical and nuclear characteristics of a particular fuel assembly design. In addition, manufacturing considerations may dictate the selection of a particular configuration for the apertures 66 over other configurations.

In this manner, effective coolant flow paths and flow communication are provided between the four, separate fuel bundles 48 of the fuel assembly 20 without the need for forming sealed passages through the four angles 38 forming the central water cross 44. Obviously, many modifications and variations of the present invention are possible in light of the above teachings. Thus, it is to be understood that, within the scope of the appended claims, the invention may be practiced otherwise than as specifically described above.

What is claimed is:

1. A nuclear fuel assembly comprising:
    an elongated outer coolant flow channel defined by a wall extending along generally the entire length of said fuel assembly,
    a plurality of four elongated structural ribs fixedly secured pressure-tight to the surfaces of said wall internally of the flow channel and disposed along generally the entire length of said flow channel, said structural ribs being disposed 90° apart about the internal periphery of said flow channel,
    an elongated central water cross providing a moderator coolant flow path for subcooled coolant moderator, said central water cross being formed by a plurality of spaced structural members secured pressure tight to said four structural ribs, said structural ribs and said spaced structural members and said flow channel defining four, elongated, separated internal compartments of said nuclear fuel assembly,
    a plurality of nuclear fuel rods disposed in each of said four compartments in heat exchange relationship with the coolant to flow through said compartments, and
    a multiplicity of transverse fuel-rod-coolant flow paths between adjacent compartments of said four compartments, said coolant flow paths disposed along the lengths of said structural ribs exteriorly of, and isolated from, said moderator flow path, and said coolant flow paths comprising a plurality of apertures formed through each said structural rib, each aperture directly interconnecting the compartments adjacent to said each rib.

2. A method of providing fuel rod coolant flow paths between adjacent elongated, separated, internal compartments within a singular nuclear fuel assembly having an outer flow channel defined by a wall, each of said internal compartments having a plurality of nuclear fuel rods disposed therein, said internal compartments being formed by spaced structural members that form between them a moderator flow path for subcooled moderator along generally the entire length of said fuel assembly, the said method comprising:
    joining each pair of corresponding of said spaced structural members pressure-tight to an elongated structural rib disposed within said flow channel extending along generally the entire length of said flow channel;
    joining each said structural rib pressure tight to the contiguous part of said wall;
    and forming a plurality of generally transverse fuel-rod-coolant flow paths between adjacent compartments of said plurality of internal compartments within said flow channel and exteriorly of, and isolated from, said moderator flow path, by forming a plurality of apertures along generally the entire lengths of said structural ribs.

3. A nuclear fuel assembly as recited in claim 1 wherein the plurality of apertures comprises a plurality of generally oval holes.

4. A nuclear fuel assembly as recited in claim 1 wherein the plurality of apertures comprises a plurality of elongated slots.

5. A nuclear fuel assembly as recited in claim 1 wherein the plurality of apertures comprises a plurality of round holes.

6. A nuclear fuel assembly as recited in claim 5 wherein the plurality of round holes comprises a plurality of round holes vertically aligned along the lengths of each structural ribs.

7. A nuclear fuel assembly as recited in claim 5 wherein adjacent ones of the plurality of round holes are laterally offset along the lengths of each structural rib.

8. A nuclear fuel assembly as recited in claim 1 wherein the plurality of apertures comprises a plurality of generally oval cutouts in each structural rib.

9. A nuclear fuel assembly as recited in claim 1 wherein the plurality of apertures comprises a plurality of elongated slotted cutouts in each structural rib.

10. A nuclear fuel assembly as recited in claim 1 further comprising means extending into said moderator flow path for maintaining the spacing between adjacent portions of the structural members.

11. A nuclear fuel assembly as recited in claim 10 wherein the maintaining means comprises a plurality of dimples formed in and along the lengths of the structural members that extend into the moderator flow path and that contact similarly shaped dimples formed in and along the lengths of adjacent facing portions of the structural members.

12. A nuclear fuel assembly including an elongated main channel for conducting a coolant, a plurality of elongated auxiliary channels each auxiliary channel being of transverse angular cross-section, means mounting said auxiliary channels within said main channel so that they extend along said main channel with the walls of adjacent auxiliary channels spaced from each other, whereby a compartment is defined between the inner surfaces of the walls of each auxiliary channel and the inner surfaces of portions of the walls of said main channel respectively opposite the walls of the said auxiliary channel and a coolant space is defined between the outer surfaces of the pairs of adjacent walls of said auxiliary channels, nuclear fuel rods mounted within each said compartment in heat transfer relationship with coolant to be conducted through said each compartment, an elongated rib extending internally of said main channel between the walls of adjacent auxiliary channel, each said rib being secured pressure tight along its inner surfaces to the walls of said auxiliary channel between which it extends, and to the contiguous wall of said main channel, and holes in each said rib establishing direct communication for coolant between the compartments on both sides of said each said rib but not between said coolant space and said compartments.

13. A nuclear fuel assembly including an elongated main channel, defined by walls, for conducting a coolant, a plurality of elongated auxiliary channels having walls, means mounting said auxiliary channels within, and cooperatively with, said main channels so that a plurality of compartments are defined between the walls of said auxiliary channels, said auxiliary channels being mounted with adjacent walls of adjacent compartments spaced so that a coolant space is defined between said adjacent spaced walls of said auxiliary channels, fuel rods mounted within each of said compartments in heat transfer relationship with the coolant to be conducted through said each said compartment, elongated ribs secured pressure tight internally of said main channel between said adjacent spaced walls of said auxiliary channels and extending along said adjacent walls and also secured pressure tight to the contiguous wall of said main channel, and holes, extending along said ribs, for establishing direct communication for coolant flow between the compartments on both sides of each of said ribs of which compartments said adjacent walls form boundaries but not between said coolant space and said compartments.

* * * * *